US005528751A

United States Patent [19]

Priem et al.

[11] Patent Number: 5,528,751

[45] Date of Patent: Jun. 18, 1996

[54] FRAME BUFFER SYSTEM DESIGNED FOR WINDOWING OPERATIONS

[75] Inventors: Curtis Priem, Fremont; Shuen C. Chang, San Jose; Hai D. Ho, Milpitas; Szu C. Sun, Mountain View, all of Calif.

[73] Assignees: Sun Microsystems, Inc., Mountain View; Samsung Semiconductor, Inc., San Jose, both of Calif.

[21] Appl. No.: 524,474

[22] Filed: Sep. 7, 1995

Related U.S. Application Data

[63] Continuation of Ser. No. 145,335, Oct. 29, 1993, abandoned.

[51] Int. Cl.[6] ..................................................... G06F 12/00

[52] U.S. Cl. ............................ 395/164; 345/98; 345/185; 345/191; 395/166

[58] Field of Search .................................... 395/162–166, 395/427, 428, 432, 436, 405; 345/185–187.98, 191, 196, 203; 365/189.01, 189.02, 189.04, 189.12, 230.02, 230.03, 230.05, 230.06, 230.08

[56] References Cited

U.S. PATENT DOCUMENTS

| | | | |
|---|---|---|---|
| 4,648,077 | 3/1987 | Pinkham et al. | 365/189.12 |
| 4,823,302 | 4/1989 | Christopher | 395/425 |
| 5,046,023 | 9/1991 | Katsura et al. | 395/162 |
| 5,282,177 | 1/1994 | McLaury | 365/230.05 |
| 5,305,078 | 4/1994 | Inoue | 365/230.03 |

*Primary Examiner*—Kee Mei Tung
*Attorney, Agent, or Firm*—Blakely, Sokoloff, Taylor & Zafman

[57] ABSTRACT

A frame buffer designed to be coupled to a data bus and to an output display in a computer system, the frame buffer including an array of memory cells for storing data indicating pixels to be displayed on the output display, address decoding apparatus for controlling access to the array, the address decoding apparatus including column address decoding apparatus for selecting groups of adjacent columns of the array, a plurality of apparatus for selectively writing to each of the columns of any of said groups of adjacent columns, a plurality of color value registers, latching apparatus for storing pixel data equivalent to a row of pixel data to be displayed on the output display, apparatus for writing pixel data from selected groups of adjacent columns of the array to the latching apparatus, and apparatus for connecting either selected ones of the color value registers, the latches, or the data bus to the apparatus for selectively writing to each of the columns of any of said groups of adjacent columns.

20 Claims, 5 Drawing Sheets

FRAME BUFFER SYSTEM DESIGNED FOR WINDOWING OPERATIONS

This is a continuation of application Ser. No. 08/145,335 filed Oct. 29, 1993, now abandoned.

BACKGROUND THE INVENTION

1. Field of the Invention

This invention relates to computer systems and, more particularly, to methods and apparatus for providing a frame buffer capable of receiving, manipulating and transferring data for display at a high rate of speed when used in a system displaying a plurality of applications simultaneously in windows on an output display device.

2. History of the Prior Art

One of the significant problems involved in increasing the ability of desktop computers has been in finding ways to increase the rate at which information is transferred to an output display device. The various forms of data presentation which are presently available require that copious mounts of data be transferred. For example, if a computer output display monitor is operating in a color mode in which 1024×780 pixels are displayed on the screen and the mode is one in which thirty-two bits are used to define each pixel, then a total of over twenty-five millions bits of information must be transferred to the screen with each frame that is displayed. Typically, sixty frames are displayed each second so that over one and one-half billion bits must be transferred each second. This requires a very substantial amount of processing power. In general, the transfer of this data to the display slows the overall operation of the computer. In order to speed the process of transferring data to the display, various accelerating circuitry has been devised. This circuitry is adapted to relieve the central processor of the computer of the need to accomplish many of the functions necessary to the transfer of data to the display. Essentially, these accelerators take over various operations which the central processor would normally be required to accomplish. For example, block transfers of data from one position on the screen to another require that each line of data on the screen being transferred be read and rewritten to a new line. Storing information within window areas of a display requires that data available for each window portion be clipped to fit within that window portion and not overwrite other portions of the display. Many other functions require the generation of various vectors when an image within a window on the display is cleared or moved. All of these operations require a substantial portion of the time available to a central processing unit. These repetitive sorts of functions may be accomplished by a graphics accelerator and relieve the central processor of the burden. In general, it has been found that if operations which handle a great number of pixels at once are mechanized by a graphics accelerator, then the greatest increase in display speed may be attained. This, of course, speeds the operations involved in graphical display.

A problem which has been discovered by designers of graphics accelerator circuitry is that a great deal of the speed improvement which is accomplished by the graphics accelerator circuitry is negated by the frame buffer circuitry into which the output of the graphics accelerator is loaded for ultimate display on an output display device. Typically, a frame buffer offers a sufficient amount of random access memory to store one frame of data to be displayed. However, transferring the data to and from the frame buffer is very slow because of the manner in which the frame buffers are constructed. Various improvements have been made to speed access in frame buffers. For example, two-ported VRAM has been substituted for DRAM so that information may be taken from the frame buffer while it is being loaded. A flash mode has been devised for allowing an entire row of a display to be written with a single color. This mode is useful when the entire display is being cleared but cannot provide clipping to limited areas and so is not useful when windows are displayed on the screen of an output display. Since the design of prior art frame buffers has produced a substantial bottle neck to rapid display of data in modern windowing systems, a new design of frame buffers allowing substantially increased display speed is desirable.

SUMMARY OF THE INVENTION

It is, therefore, an object of the present invention to provide a new design of frame buffer capable of rapidly handling the data transferred to it for display in a system which presents a plurality of applications in separate windows on an output display device.

It is another more specific object of the present invention to provide a new design of frame buffer capable of speeding the display of data by factors which are the order the magnitude of the prior art frame buffers.

These and other objects of the present invention are realized in a frame buffer designed to be coupled to a data bus and to an output display in a computer system, the frame buffer including an array of memory cells for storing data indicating pixels to be displayed on the output display, address decoding apparatus for controlling access to the array, the address decoding apparatus including column address decoding apparatus for selecting groups of adjacent columns of the array, a plurality of apparatus for selectively writing to each of the columns of any of said groups of adjacent columns, a plurality of color value registers, latching apparatus for storing pixel data equivalent to a row of pixel data to be displayed on the output display, apparatus for writing pixel data from selected groups of adjacent columns of the array to the latching apparatus, and apparatus for connecting either selected ones of the color value registers, the latches, or the data bus to the apparatus for selectively writing to each of the columns of any of said groups of adjacent columns.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION OF THE INVENTION

Figure 1:
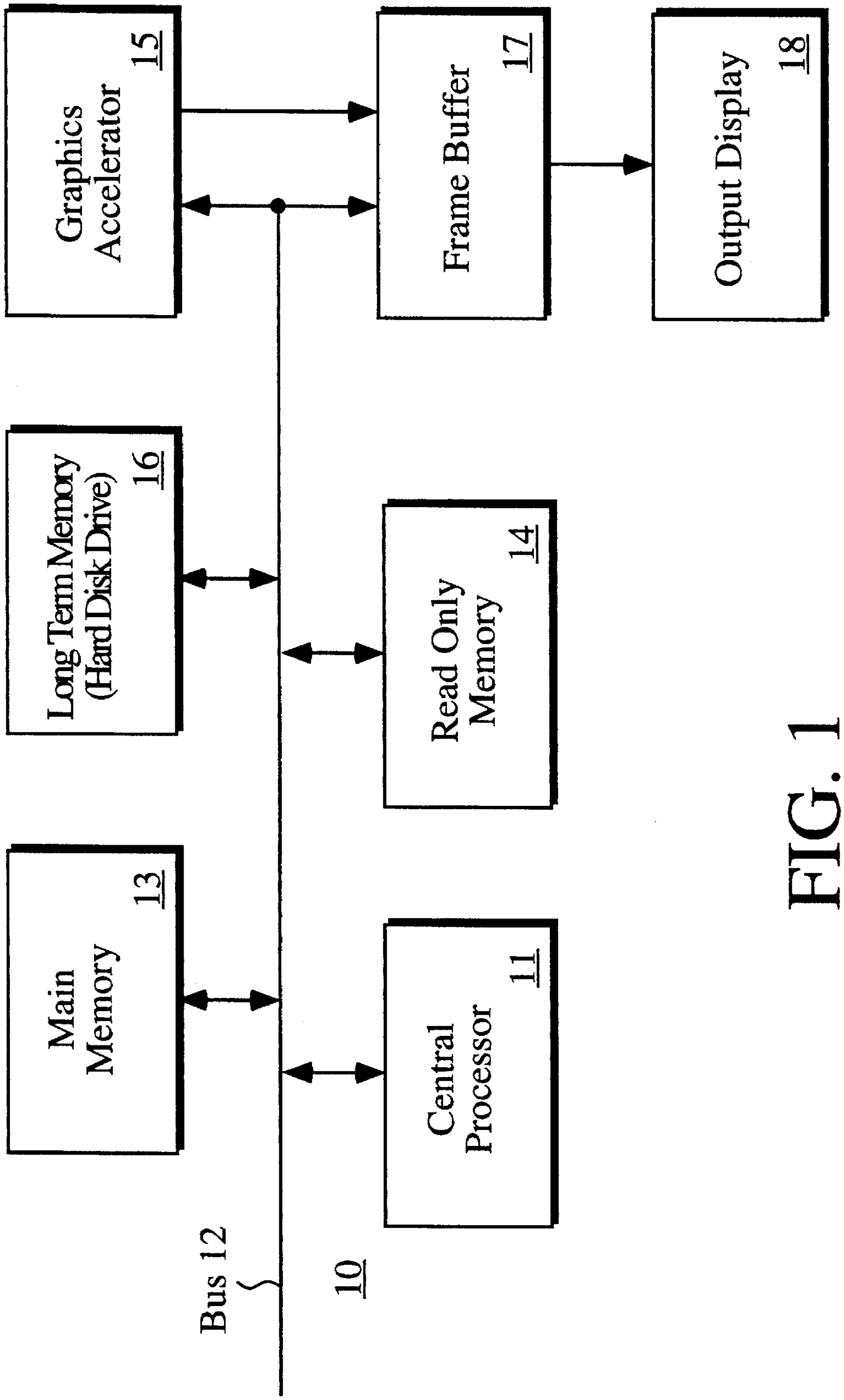
FIG. 1 is a block diagram illustrating a computer system including the present invention.

Referring now to FIG. 1, there is illustrated a computer system 10. The system 10 includes a central processor 11 which carries out the various instructions provided to the computer 10 for its operations. The central processor 11 is joined to a bus 12 adapted to carry information to various components of the system 10. Joined to the bus 12 is main memory 13 which is typically constructed of dynamic random access memory arranged in a manner well known to those skilled in the prior art to store information being used by the central processor during the period in which power is provided to the system 10. Also joined to the bus 12 is read only memory 14 which may include various memory devices (such as electrically programmable read only memory devices (EPROM or similar devices)) well known to those skilled in the art which are adapted to retain memory condition in the absence of power to the system 10. The read only memory 14 typically stores various basic functions used by the processor 11 such as basic input/output processes and startup processes.

Also connected to the bus 12 are various peripheral components such as long term memory 16. The construction and operation of long term memory 16 (typically electro-mechanical hard disk drives) are well known to those skilled in the art. Also joined to the bus 12 is circuitry such as a frame buffer 17 to which data may be written that is to be transferred to an output device such as a monitor 18 for display. For the purposes of the present explanation, the frame buffer may be considered to include in addition to the various memory planes necessary to store information, various circuitry well known to those skilled in the art for controlling the scan of information to the output display.

Figure 2:
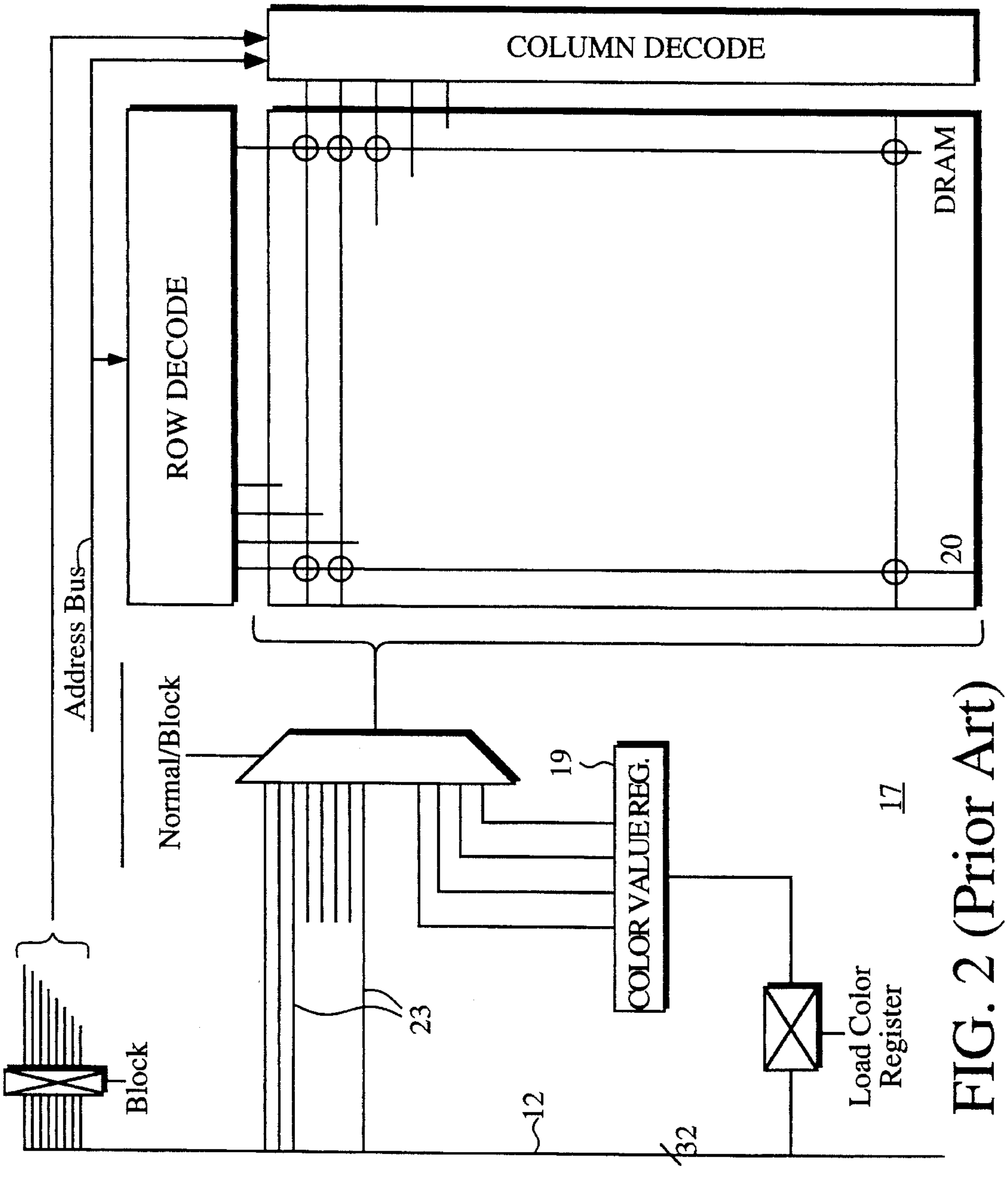
FIG. 2 (Prior Art)
FIG. 2 is a block diagram of a frame buffer designed in accordance with prior art.

FIG. 2 illustrates a frame buffer 17 constructed in accordance with the prior art. Typically, such a frame buffer 17 includes a dynamic random access memory array designed to store information defining pixels on the output display. When the random access memory of a frame buffer 17 is accessed in its normal mode of operation, data is written to or read from the frame buffer 17 on the conductors of the data bus 12. When the frame buffer 17 is written, all of the data conductors of the bus transfer the binary data to be stored as pixel information. In a typical computer system having a thirty-two bit bus, thirty-two bits of information may be written on the bus and appear at thirty-two input pins to the frame buffer memory. This data may define one or more pixels depending upon the number of bits required to define a pixel in the particular display mode. For example, in an eight bit color mode of operation, each pixel displayed requires eight bits of data; and thirty-two bits of data on the data conductors of the bus are capable of defining four pixels in each individual access. Writing pixel data one (or four) pixels at a time is a relatively slow method of filling the frame buffer with data to be written to the display. This is, however, the usual mode of writing pixel data to the display. This normal mode is typically used in any process which varies the display on a pixel by pixel basis or to describe any graphical image which uses more than two colors in a window.

There are many operations which affect the display, however, which manipulate very large numbers of pixels and do not require that pixels be individually varied. These operations include, for example, clearing the entire display or a window of the display and similar operations. Because filling the frame buffer is so slow when each pixel is individually described on the data conductors, some prior art frame buffers also have apparatus which allows a mode of operation (referred to as "block mode") in which each of the data conductors controls access to four bits representing a pixel color value. This block mode allows data representing a color value to be written simultaneously to a plurality of individual pixel positions in the memory. In this block mode, the information written to the array on the data conductors is control information used to enable writing to memory positions representing particular pixel positions and to ignore other pixel positions.

The prior art frame buffer 17 of FIG. 2 has a plurality of data input conductors 23 and a four bit color register 19. A four bit color value to be stored as pixel data in data positions in an array 20 of the frame buffer 17 is written into the color register 19. Data transferred to the frame buffer 17 on the data conductors 23 indicates the positions of pixels which are to be written and of those pixels which are not to be written. For example, if a data conductor 23 carries a zero value, then the pixel position controlled by that conductor is not written. If a data conductor 23 carries a one value, then the four bit color value from the color register 19 is written into the pixel position. In this way, selected ones of a number of individual pixels may be written at once using the color value stored in the color register 19. This is a very useful manipulation if it is desired to accomplish manipulation of large areas using the same color. For example, with a thirty-two bit bus, one may rapidly clear a window by writing a background color to the entire window of a display in accesses of thirty-two pixels at a time. This mode also allows pixel data to be clipped to fit within a window since it allows control signals to write a color within a window and disable the writing of the color to pixel positions outside the window.

One problem with this prior art block mode of operation is that it can only be used with the outdated four bit color mode of operation. A greater problem is that prior art frame buffers are only capable of dealing with one color at a time although more than one pixel may be written simultaneously with that color using the block mode. On the other hand, the graphical accelerating devices and software which furnish pixel information to the frame buffer 17 typically manipulate two colors at once. Thus, while an entire screen may be cleared rapidly using this block mode, more advanced manipulations slow down the system operation. For example, when any information pattern is written to the frame buffer, a first background color must be placed in the color register; and the entire first row of the particular window must be cleared by writing the background color. Then the foreground color is placed in the color register, and the foreground pixels are written to the row. Then the background color is again placed in the color register, and the entire second row of the particular window is cleared. The background color is again replaced in the color register with the foreground color, and the foreground pixels are written for the second row. This continues until all of the rows of the window have been written with both of the colors necessary to the display.

In prior art frame buffers, each access of the frame buffer requires both a row address strobe (RAS) cycle of 120 nanoseconds and a column address strobe (CAS) cycle of 20 nanoseconds. This is true for accessing the frame buffer to load the color register and for accessing the memory positions in the frame buffer. Once the row address strobe has been furnished, a single column address cycle may overlap the row address strobe signal so that a total of 120 ns. is required for any particular operation. When a memory position is accessed, the row address is furnished on the falling edge of the P, AS cycle; and data is written or read on the falling edge of the CAS cycle. Once a RAS signal has been initiated, a plurality of pixels may be read or written in the same row as long as no other operation intervenes with only a CAS cycle required for each group of thirty-two pixels. However, since the same RAS/CAS sequence is used for operations other than reading and writing to the memory cells, to load the color register with background color takes a first 120 nanoseconds, writing the background color takes another 120 nanoseconds, reloading the color register with foreground color takes another 120 nanoseconds, and writing the foreground color takes another 120 nanoseconds.

The time necessary to reload the color register twice on each row and the requirement to write twice to each of the thirty-two bit positions in each row together slow the operation significantly. For example, if it is desired to write to an area of a window in order to change the data presented, it is first necessary to change the value in the color register to the back ground color for the area, then write the background, then change the value in the color register again, and finally write the foreground color.

One of the slowest operations performed in such a prior art frame buffer is the scrolling of data. In a scrolling operation rows of data are moved up or down on the output display. Since the data describing the pixels which are displayed on an output display device is stored in a frame buffer, scrolling requires that the pixel data in the frame buffer describing a row of the display be read from the frame buffer by the central processor and written back to another position in the frame buffer. In a typical personal computer, thirty-two bits of data (one pixel in thirty-two bit color or four pixels in eight bit color) are read from the frame buffer simultaneously in an operation that typically requires 140 nanoseconds; typically an extra 20 ns. is required to read when data must be taken off of the frame buffer chip. This is followed by an access to write the data back to the appropriate positions in the frame buffer, an access which again requires 120 nanoseconds. This pattern of reading and writing is continued until an entire row has been read and rewritten. Since a typical screen may hold rows of 1024 pixels, 140 nanoseconds plus 120 nanoseconds times 1024 pixels is required to scroll a single row of thirty-two bit color pixels on the display or one-fourth that time for eight bit pixels. Each line of text takes up approximately twelve rows of pixels so scrolling a line of text takes a very long time.

Another problem with the prior art frame buffers relates to the circuitry by which data is taken from the array and transferred to the output display circuitry. Typically, the circuitry requires a shift register output stage sufficient to hold an entire row of pixels on the display. A row of pixel data is transferred into this shift register circuitry and shifted out to the display on a pixel by pixel basis. A shift register sufficient to hold an entire row of pixels takes a large amount of space on the frame buffer. This space is space which is then not available to accomplish other, often more useful, techniques.

In addition to these problems of prior art frame buffers, a number of other problems exist which tend to slow the operation of displaying data.

Figure 3:
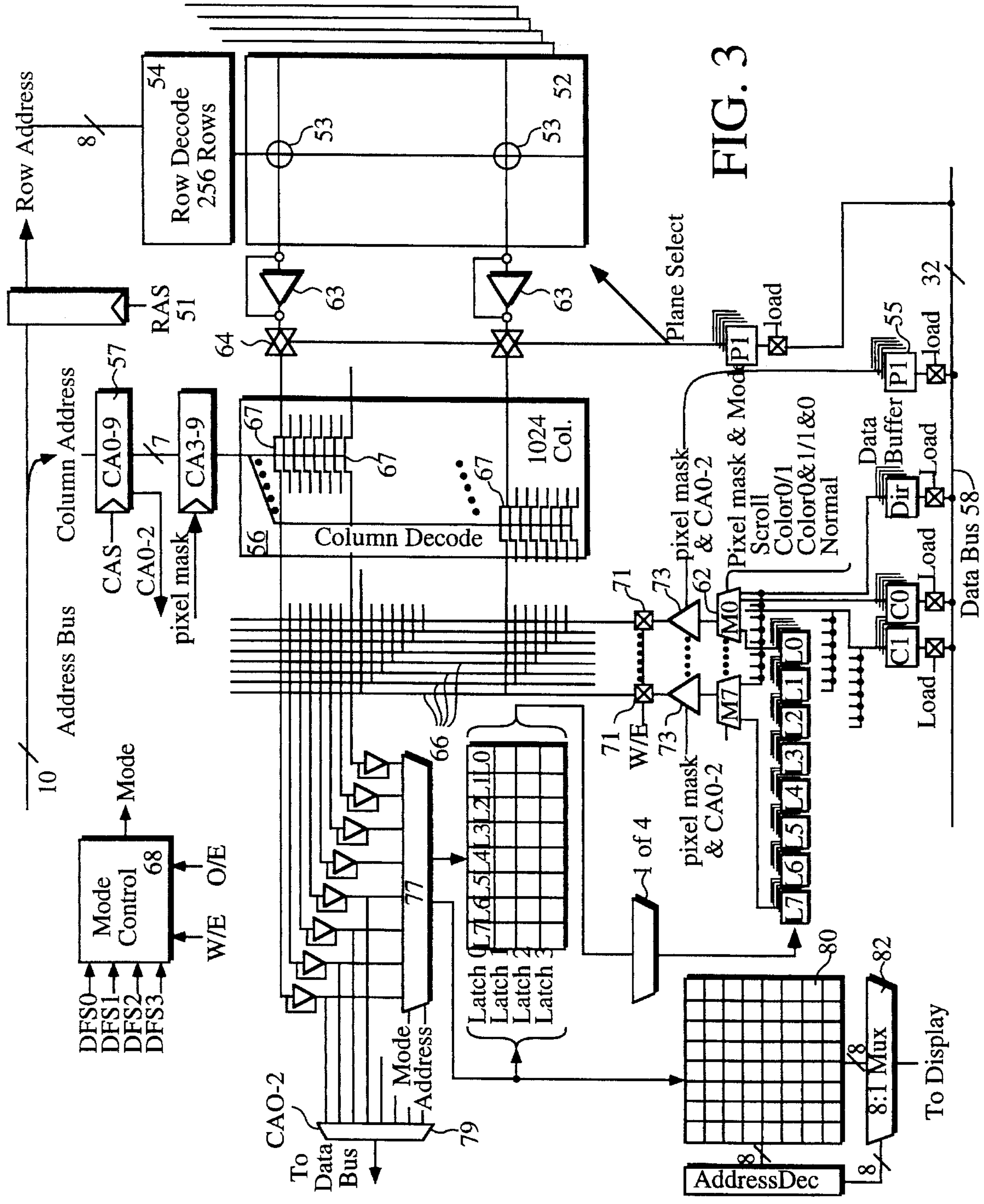
FIG. 3 is a block diagram of a frame buffer designed in accordance with the present invention.
Figure 5:
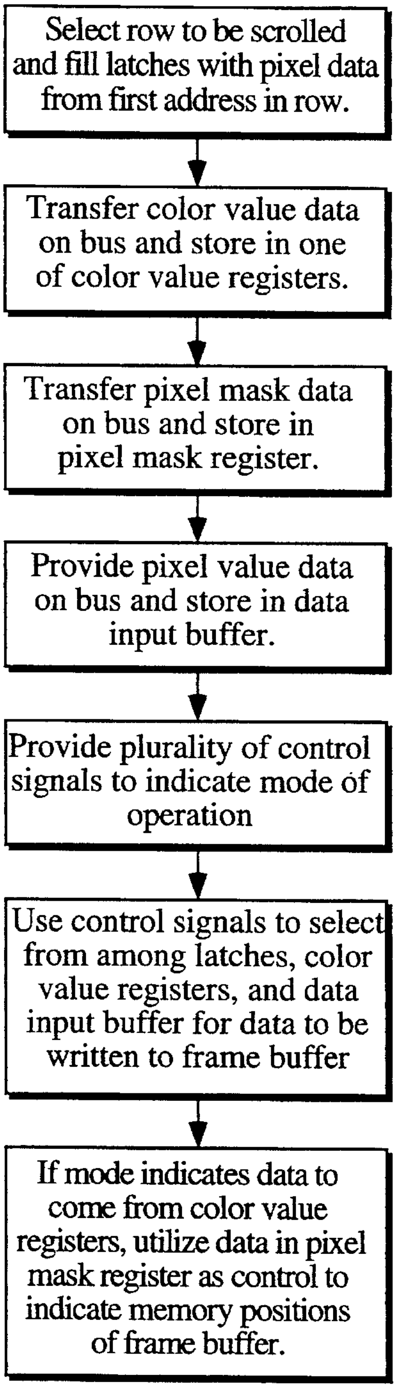
FIG. 5 is a flow chart illustrating a method in accordance with the invention.

Referring now to FIG. 3, there is illustrated a detailed block diagram of a frame buffer 50 designed in accordance with the present invention while FIG. 5 illustrates a method in accordance with the invention. FIG. 3 illustrates a circuit board upon which reside the various components of a frame buffer 50. The frame buffer 50 includes a plurality of memory cells 53 such as field effect transistor devices arranged to provide a dynamic random access memory array 52. The arrangement of the cells 53 constituting the array 52 is developed in accordance with principals well known to those skilled in the art. It is adapted to provide a sufficient number of addressable memory cells 53 in the array 52 to describe the number of pixels to be presented on an output display device in a particular mode of operation. For example, the array 52 may include a total of thirty-two planes (only the first is illustrated in detail in FIG. 3), each plane including 256 rows, each row including 1024 memory devices; such an arrangement allows the storage of color data sufficient to display thirty-two bit color in a 512×512 pixel display on a color output display terminal. Although the frame buffer 50 may display both thirty-two bit and sixteen bit color modes as well as other modes well known to those skilled in the art, the frame buffer 50 is particularly adapted for use with pixels displaying color in eight bit color modes.

In addition to the array 52, the frame buffer 50 includes row and column decode circuitry for decoding the addresses furnished by a controller such as a central processor and selecting individual memory cells in each plane of the array 52 to define the various pixels which may be represented on an output display device. The address decoding circuitry includes row decoding circuitry 54 and column decoding circuitry 56 by which individual memory cells 53 representing bits of individual pixels may be selected for reading and writing. Also included as a part of the frame buffer 50 are data conductors 58 which may be connected to a data bus to provide data to be utilized in the array 52. Typically, thirty-two data conductors 58 are provided although this number will vary with the particular computer system. The number thirty-two matches the number of bits which are transferred to indicate the color of a single pixel of the largest number of bits expected to be used by the display system in the most accurate color mode of operation.

When data is written to the frame buffer 50 on the conductors 58 of the data bus in the normal mode of operation, each group of thirty-two bits defines one or more color values to be displayed at one or more pixel positions on the output display. Thus, when an output display is displaying data in an eight bit color mode, the thirty-two bits carried by the data conductors 58 in normal write mode may define four pixel positions on the display. On the other hand, when a display is displaying data in a thirty-two bit color mode, the thirty-two bits of the data conductors 58 carry information defining a single pixel position on the display. As may be seen, one of the data conductors 58 of the bus is connected through an input data buffer to all of eight multiplexors 62 in each plane of the array. The embodiment illustrated in FIG. 3 is particularly adapted to be used in a system utilizing eight bit color modes; and, to this end, the system utilizes eight individual multiplexors 62 in each plane of the frame buffer 50 for selecting particular write input data. Each of these multiplexors 62 has its output connected to one of eight tri-state write drivers 73 which furnishes an output signal via a write enable switch such as a transmission gate 71 on a conductor 66 connected to every eighth column of the particular plane of the array. Each of the multiplexors 62 selects the source of the data to be transferred to the array 52 in each plane depending on the mode of operation selected. Thus, in normal mode, the data bit is selected directly from the data conductor 58 for that plane of the array. The bit is transferred from one of the multiplexors 62 by one of the eight write drivers 73 to a particular selected column and written to the memory cell 53 at that column and the selected row. Since a bit may be written in each of thirty-two planes of the array, thirty-two bits may be written from the bus conductors 58 (one to each plane) as one thirty-two bit pixel, two sixteen bit pixels, or four eight bit pixels, depending on the color mode in which the system is operating.

As is shown in FIG. 3, a mode control circuit 68 is provided to designate the particular mode of operation in which the frame buffer is to operate. To accomplish mode selection, four control signals DSF0–DSF3 are furnished along with write enable and output enable signals. The combination of these signals produces the particular output mode control signals in a manner well known to those skilled in the prior art.

In a normal mode write operation as practiced in the prior art, a particular address is transferred on the address bus to select a particular row and column. The row address is furnished to the row decode circuitry 54 by a row address latch 51 on the falling edge of a row address strobe signal. The row address causes power to be furnished to all of the memory cells 53 joined to the particular row of the array in each of the selected planes. Once power has been furnished to the appropriate row of the array, the value of each memory cell in the row is sensed by a sense amplifier 63 for each column of the array. The sense amplifiers 63 are turned on, and each sense amplifier 63 drives the value sensed back to refresh the memory cell 53 in the selected row.

At the falling edge of the CAS signal, the column address is transferred from a latch 57 and applied to the appropriate switches 67 of the column decode circuitry 56 to select the appropriate columns in each plane to be written. In embodiment of the frame buffer 50 illustrated, the column address is ten bits. Of these ten bits, the higher valued seven bits CA3–9 of the column address are used to select a group of eight adjacent columns. The normal mode write control signal at each of the multiplexors 62 causes the data signal furnished on the single conductor 58 associated with that plane to be transferred from the data input buffer by each of the eight multiplexors 62. One of the signals produced by the multiplexors 62 is amplified by a single one of the write drive amplifiers 73 and transferred to the addressed memory cell 53 in that plane of the array. The lower three bits CA0–2 of the column address from the latch 57 select the particular one of the eight write drive amplifiers 73 which transfers the data bit to a single one of the columns. Since each of the conductors 58 associated with each plane of the array 52 carries an individual bit for the memory cell at the selected row and column, the pixel value (or values) will be transferred to the appropriate column and row position in each plane of the array.

In a similar manner, when a particular pixel value is to be read from the array 52 in the normal mode of operation, the row and column addresses are transferred to the decode circuitry 54 and 56. A row address is selected on the falling edge of the RAS signal; and the entire row of memory cells in each selected plane of the array 52 is refreshed. At the falling edge of the CAS signal, the higher valued seven bits CA3–9 of the column address are applied to the appropriate switches 67 of the column decode circuitry 56 to select the eight adjacent columns in each plane which have been addressed and are to be read. The condition of the memory cells 53 in each of these eight columns of each selected plane are sensed by a second set of output sense amplifiers 75. The output of a particular one of the columns is selected by a multiplexor 79 in each plane which is controlled by the normal mode read signal and the value of the lower three bits CA0–2 of the column address. This causes the condition of a particular memory cell 53 to be transferred to a particular one of the conductors 58 of the data bus associated with that plane of the array 52. Thus, as has been illustrated, the frame buffer 50 carries out the typical normal read and write modes of operation.

The frame buffer 50 also includes at least a pair of color value registers C0 and C1 which are utilized to store color values which may be used in color block modes of operation described hereinafter in which a plurality of storage positions may be written simultaneously. Each plane of the array includes a one bit register C0 and a one bit register C1 for storing one bit of a color value. Since each plane includes one bit for each register, each register C0 and C1 includes a total of thirty-two bits in the preferred embodiment. Thus an entire eight bit color value may be stored in the registers C0 and C1 residing on eight planes, an entire sixteen bit color value may be stored in the registers C0 and C1 residing on sixteen planes, and an entire thirty-two bit color value may be stored in the registers C0 and C1 of thirty-two planes of the frame buffer 50. With a thirty-two bit color register such as is shown, the color pattern for a particular eight bit color value may be repeated four times in each color register (similarly a sixteen bit color may be repeated twice). The color registers C0 and C1 may be selectively addressed so that they may be loaded by data furnished on the conductors 58 of the data bus; as may be seen, switches are provided in each cell plane to allow loading of the registers C0 and C1 with color value data from the data conductors 58. The details of the color block registers and their use are described in the U.S. patent application Ser. No. 08/145,755, entitled *Apparatus for Providing Fast Multi-Color Storage in a Frame Buffer*, Priem et al, filed on even date herewith.

The color registers C0 and C1 provide color values which the multiplexors 62 may select for writing to the cells of the memory array instead of the data furnished on the conductors 58. The selection by the multiplexors 62 of color values from the registers C0, C1 or of pixel data from the conductors 58 depends on the particular color mode of operation, a value indicated by control signals furnished by the central processor or by an associated graphical accelerating device.

When a color block mode of operation is indicated by the control signals, the data conductors 58, rather than carrying pixel data, carry enabling signals to indicate pixel positions in the array 52 to which the color values held in the registers C0 and C1 are to be written. These color values are initially loaded from the data conductors 58 of each array plane of the frame buffer 50 in response to a load color register control signal. Since two color registers C0 and C1 are provided in the preferred embodiment, a total of four color block modes of operation are possible. These modes are referred to as color 0 mode, color 1 mode, color 0&1 mode, and color 1&0 mode. As will be seen, substantial time is saved with any of these modes of operation simply through the lack of a requirement to load the color value registers for writing to each row of the display.

In the color 0 mode of operation, if a control signal value of one is transferred on a particular data conductor 58, then the value in the color register C0 is written to the storage positions controlled by that conductor 58. The value in the color register C0 is also transferred to all other storage positions by data conductors 58 which transfer a control signal with a one value. On the other hand, no color value is written to the pixel positions controlled by a data conductor 58 on which a zero control value is transferred. Thus, thirty-two different pixel positions may be affected in a single simultaneous transfer; those positions which receive a one value are enabled to receive the value in the color register C0 while those which receive a zero value remain unchanged.

The manner in which this is accomplished will be illustrated in a case of eight bit color. Presuming that the color value register C0 has been loaded with a color value pattern of eight bits which is repeated four times in the thirty-two bits provided in that register and that the color value register C1 has been loaded with another color value pattern of eight bits which is repeated four times in the thirty-two bits provided in that register, then a row and eight columns are selected by the address on the address bus through the row and column address decode circuitry 54 and 56 in the manner described above. Assuming that color block mode 0 is selected, all eight of the multiplexors 62 of each plane select the register C0 as the source of color data for the array. Then the particular write drivers 73 are enabled in accordance with the enabling signals appearing on the conductors 58 of the data bus.

Figure 4:
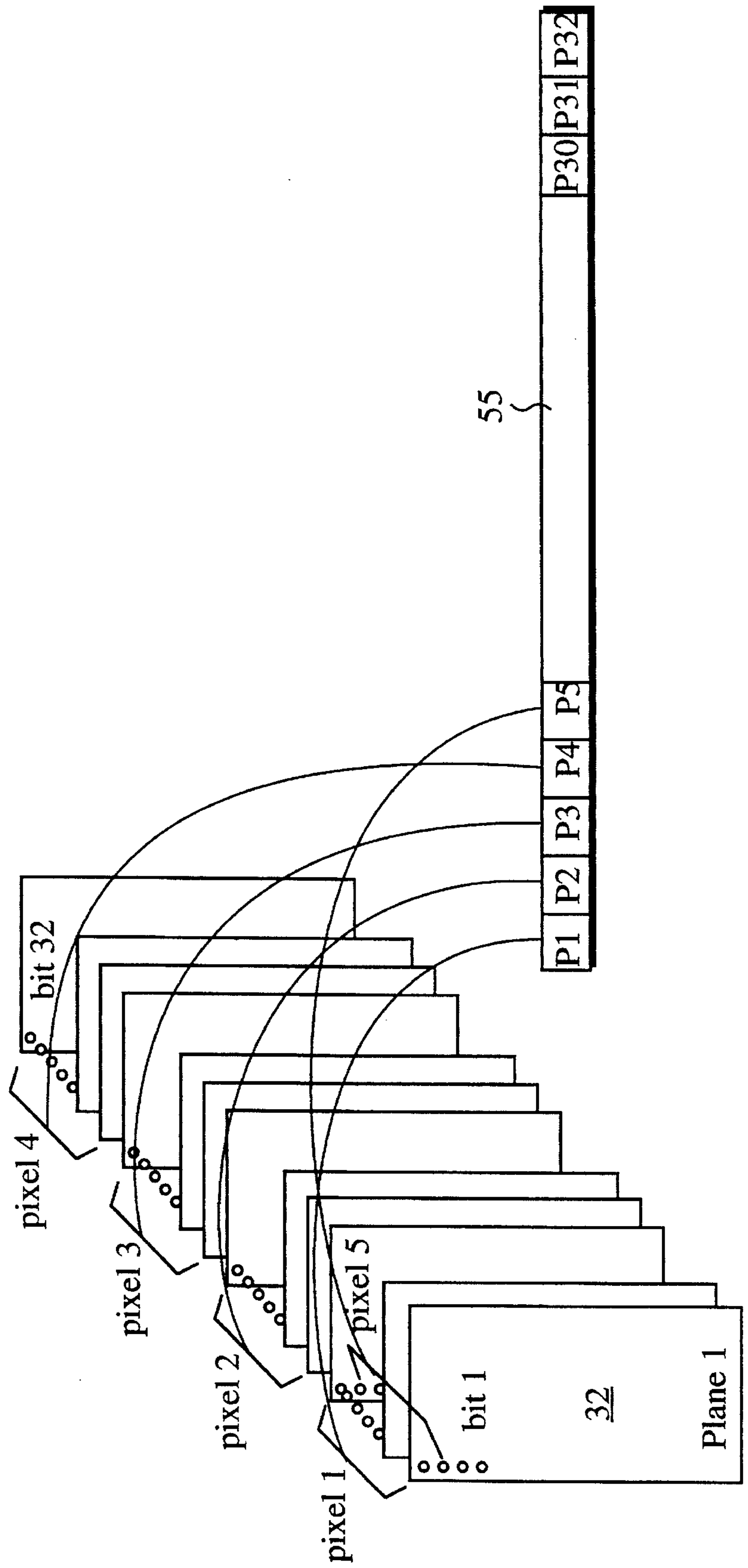
FIG. 4 is a diagram illustrating operational details of a portion of the frame buffer of FIG. 3.

The control data appearing on the conductors 58 is sent to a pixel mask register 55. The bits of the pixel mask register 55 are used in the manner illustrated in FIG. 4 in each of the array planes to control all of the drivers 73 controlling transfer of data to a particular pixel. Since the example considered involves eight bit color and assuming that the first eight columns have been selected by the column address, the bits defining the first pixel lie in the first column in the selected row and the first eight planes of that column. The first pixel P1 in the pixel mask register 55 controls the appropriate drivers 73 controlling the first column and the first eight planes to transfer the color to these bit positions in the array from the color value register C0. Consequently, with one row and eight columns selected, a total of thirty-two eight bit color pixels may be written simultaneously with the value stored in the color value register C0.

This is a fast mode of operation similar to the four bit block mode used in prior art frame buffers and may be used to clear the screen very rapidly or to otherwise provide a single color to the window area. For example, a frame buffer 30 for a display which is 1024×780 pixels and eight bits deep, may be cleared approximately thirty-two times faster than individual pixels may be written one by one to the frame buffer 50. This mode is also useful for clipping since a color value may be written to pixel positions inside a window area while the pixel positions outside that window area are not enabled.

Color 1 mode is similar to color 0 mode except that if a one value is transferred on a particular data conductor 58, then the value in the color register C1 is written to the storage positions which define the pixel addressed for that conductor 58. The value in the color register C1 is also transferred to all other storage positions at addresses enabled by one values transferred on the data conductors 58. On the other hand, no color value is written to the pixel positions to which a zero is transferred on the data conductors.

As may be seen, since the two color registers C0 and C1 may be loaded prior to manipulating any portion of a window and are always available, a series of pixels (e.g., thirty-two) may be written and clipped in two accesses without any need to reload color registers. Background color may be written in a first access and foreground color written in a second access without any need to reload a color register between accesses.

However, even faster writing is possible using the color modes 0&1 and 1&0 in those portions of the display in which clipping is unnecessary. As is pointed out in the co-pending patent application referred to above, most operations involved in writing to the display utilize two colors. Typically, a rendering chip (graphics accelerator) or the central processing unit provides a control signal indicating where clipping is necessary. In the absence of this signal, use of the modes 0&1 and 1&0 allow two colors to be written simultaneously to the frame buffer. In these modes a zero value on a data conductor 58 indicates that a color value is to be written to the controlled pixels from one color value register while a one value on a data conductor 58 indicates that a color value is to be written to the controlled pixels from the other color value register.

This is accomplished by combining the control value transferred on the data conductor 58 for each plane and stored in the pixel mask register 55 with the color mode control signal to select the particular color register from which the color value is transferred by each of the multiplexors 62. For example, when in color mode 0&1 or 1&0, a zero in a bit position in the pixel mask register 55 causes a multiplexor 62 to select the color value stored in one color value register while a one in a bit position in the pixel mask register 55 causes a multiplexor 62 to select the color value stored in the other color value register. Then, the color mode control signals indicating mode 0&1 or 1&0 control all of the pixels selected to be written by the drivers 73 to the array. This allows two separate colors representing both foreground and background to be written simultaneously to those portions of a window area which do not require clipping.

The provision of the two color value registers allows a number of new methods of writing data to the frame buffer to be practiced in addition the color modes described. For example, in addition to writing in groups of thirty-two pixels at once using the color registers C0 and C1, block modes are provided by which an entire row of pixels may be written from the color registers in one color with clipping or in two colors unclipped. These modes are referred to as block 256, block 512 and block 1024 modes and are described in detail in the U.S. patent application Ser. No. 08/195,791, entitled *Multiple Block Mode Operations in a Frame Buffer System Designed for Windowing Operations*, Priem et al, filed on even date herewith.

In block 256 mode, the value on each data conductor determines the color value which is written to thirty-two adjacent eight bit pixel positions. This is accomplished by the column address selecting one quarter of the total of columns (256) in each plane of the array simultaneously. Then each of the pixels connected to each of these columns receives the single color value in a color value register designated by the value carried on the data conductor in the particular color mode. It will be seen that in block 256 mode a total of thirty-two times thirty-two eight bit pixels (1024 pixels) are affected at once by each write access. This is a typical number of pixels in a row of a modern computer color monitor. Thus, each access of eight bit pixels in block 256 mode may write all of the pixels in a 1024 pixel row. It will be appreciated that this mode may be used to very rapidly clear an entire screen or to write a pattern which varies in thirty-two bit blocks on the screen.

However, in any case in which two colors are written to the frame buffer in the same access using the block 256 mode, the data conductors are not available to provide clipping signals. For this reason, it is necessary to utilize the color 0 and color 1 modes at the boundaries of a window in order to accomplish clipping of the window. These single color modes may be used at the window crossings at each side of each row containing a window to write a background color to the window edge on a first access and then to write a foreground color to the window edge on a second access. In a similar manner, because the granularity of the access is so large with the block 256 mode, it often must be used with the other modes to clip to a window edge. That is, since each control bit affects thirty-two pixels, block 256 mode can only select pixels to write and not write in adjacent groups of thirty-two pixels. Consequently, the block 256 mode must be used with block 8 mode to clip to an exact window edge.

A second additional mode is referred to as block 512 mode. In block 512 mode each data conductor affects the value of data written to thirty-two adjacent sixteen bit pixel positions. In this mode, the column address selects a total of half the columns in each plane simultaneously. This mode requires the increase in number of selection conductors, multiplexors 62, and other components discussed above to sixteen. This mode is used with the block 16 mode in the same manner that block 256 mode is used with block 8 mode to rapidly write to an entire row within a clipped window area of the display. A third additional mode is referred to as block 1024 mode. In block 1024 mode, all of the columns in each plane are selected simultaneously by the column address. This mode requires the increase in number of selection conductors, multiplexors 62, and other components discussed above to thirty-two. In block 1024 mode, each data conductor affects the value of data written to thirty-two adjacent thirty-two bit pixel positions. This mode is used with the block 32 mode in the same manner that block 256 mode is used with block 8 mode to rapidly write to an entire row within a clipped window area of the display. Each of these modes provides useful functions in the same manner as does block 256 mode but for configurations of frame buffers storing data describing sixteen bit and thirty-two bit pixels.

In addition to the color values registers C0 and C1 which provide fast operation, the frame buffer 50 of FIG. 3 includes output circuitry by which pixel data is shifted to an output display device (not shown in the figure). This includes a an array of transmission gates 77 which is utilized to shift data eight bits at a time from each plane of the array to an output shift register 80. The shift register 80 in each plane includes a total of sixty-four bit positions. Thus, the register totals 256 bytes in the thirty-two planes of the preferred embodiment, a value equivalent to one-fourth of a row on a display having 1024 pixel positions in a row. The data in the register 80 is then shifted a bit at a time from each plane by another multiplexor 82 to a circuitry controlling the display of the pixel data on an output display device. It will be recognized that this shift register is substantially smaller than that typically used at the output of a frame buffer and consequently uses much less circuit board area.

The frame buffer 50 also includes circuitry designed to provide an extremely rapid scrolling operation. The scrolling operation is described in detail in U.S. patent application Ser. No. 08/145,791, entitled *METHOD AND APPARATUS FOR INCREASING THE RATE OF SCROLLING IN A FRAME BUFFER SYSTEM DESIGNED FOR WINDOWING OPERATIONS*, Priem et al, filed on even date herewith. That scrolling operation is described, in general, at this point in order to explain the use of the various circuitry of the frame buffer.

In the scrolling operation, the data is first read from the array and then written back to the array to a new row without being removed from the frame buffer 50. In order to accomplish this, a scroll mode signal is initiated by the controlling circuitry (central processor or graphics accelerator); and an address is furnished to the row and column decode circuitry to designate the particular data to be scrolled. The scroll mode may cause a particular row to be selected at the falling edge of a RAS signal as in normal mode of operation and the memory cells of that row to be refreshed. The higher order bits of the column address are used to select eight adjacent columns of the address. The mode signal at the array of transmission gates 77 of each plane causes the data in the memory cells of each of the eight columns selected to be transferred to a first eight bit latch shown as latch 0 in the figure. A next sequential address causes the data in the memory cells of each of the next eight columns to be selected and to be transferred to a second eight bit latch shown as latch 1 in the figure. This continues for two more read operations which select two more sets of eight memory cells in each plane and place the results read in third and fourth eight bit latches latch 2 and latch 3.

Thus, in a set of four read operations taking only 180 ns (one RAS/CAS of 120 ns. followed by three CAS cycles of 20 ns. each), a total of thirty-two bits in each of thirty-two planes is read and stored in the Latches 0–3. This means that in four individual accesses requiring in total a single RAS signal and a four CAS signals taking 180 ns., a total of 128 eight bit pixels, may be stored in the latches 0–3. Thus, an entire row of pixels on a display 1024 pixels wide may be accessed and stored in a total period of eight times 180 ns. or 1440 ns.

As is shown in FIG. 3, each latch 0–3 is connected so that its individual bits may be selected by a multiplexor 81 to be furnished to the multiplexors 62. In the figure, one of the latches 0–3 is illustrated with each of its bit positions furnishing input to each of the eight individual multiplexors 62 of that memory plane. This allows four sequential write operations to four consecutive addresses, taking approximately 180 ns., to write the data being scrolled back to the new row positions in the array 52 to which the row is addressed. As with the scroll read operation, the scroll mode control signal causes the higher bits of the column address to select the appropriate eight adjacent columns in each write operation. The scroll mode control signal then selects all of the columns using the drivers 73 and the write enable switches 71. In each write back operation used in scrolling, the values in each of the individual bit latches 0–3 are then driven onto the array by overdriving the sense amplifiers 63 to establish the new values at the selected memory positions in the appropriate cells of the array. Thus, the total time required to read and write back the data to scroll 128 pixels is only 180 ns. while a row requires 1440 ns., approximately one-85th of the time required to scroll in prior art arrangements.

An additional facility of the invention allows it to clip pixel data to fit windows in which that data is stored at the same time that scrolling is taking place. It will have been noted that during any period in which scrolling is occurring, the conductors 58 on the data bus are not being used for the scrolling. By sending enabling signals on the data conductors 58 to the write enable gates 71 of each array, clipping may be accomplished. For example, if a first data conductor 58 carries a zero indicating that a write is not to occur and that signal is applied to disable the transmission gates 71 connected to all of the conductors 66 (one in each plane of the array 52) affecting the bits of a particular pixel, then the bits in the particular latch bit position will not be written. Thus an entire pixel may be clipped. If all of the data conductors controlling pixel positions outside a window carry zero values, then the entire area outside a window may be clipped while the scrolling is occurring.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer system comprising:

a central processing unit, main memory, a busing system including a data bus, an output display, and a frame buffer joining the busing system to the output display, the frame buffer comprising an array of memory cells for storing data indicating pixels to be displayed on the output display, access circuitry for selecting memory cells in the array, first and second color value registers, a plurality of latches, wherein data to be read from the array and data to be written to the array is stored, circuitry for writing pixel data from the array to the latches, and circuitry coupled to the latches and the color value registers for writing pixel data selectively from the color value registers or from the latches to a plurality of storage positions in the array simultaneously.

2. A computer system as claimed in claim 1 in which the circuitry for writing pixel data selectively from the color value registers or from the latches to a plurality of storage positions in the array simultaneously comprises a plurality of multiplexors connected to each of the color value registers and to the latches, and a source of control signals for causing the multiplexors to select pixel data from the color value registers or from the latches.

3. A computer system as claimed in claim 2 in which the source of control signals for causing the multiplexors to select pixel data from the color value registers or from the latches comprises circuitry for transferring control signals on the data bus.

4. A computer system as claimed in claim 1 further comprising circuitry for causing multiplexors to select pixel data from the data bus.

5. A computer system as claimed in claim 1 further comprising a shift register providing a number of storage positions substantially less than the number of pixels in a row of a display, and circuitry for writing pixel data to the shift register from the array for presentation on an output display.

6. A computer system as claimed in claim 1 in which the array of memory cells is arranged in a plurality of planes, and further comprising circuitry for selecting any of the plurality of planes for accessing.

7. A frame buffer designed to be coupled to a data bus and to an output display in a computer system, the frame buffer comprising an array of memory cells for storing data indicating pixels to be displayed on the output display, access circuitry for selecting memory cells in the array, first and second color value registers, latching circuitry for storing pixel data equivalent to a plurality of pixels in a row of pixel data to be displayed on the output display, where data to be read from the array and data to be written to the array is stored in the latching circuitry, circuitry for writing pixel data from the array to the latching circuitry, and circuitry coupled to the latching circuitry and the color value registers for writing pixel data selectively from the color value registers or from the latching circuitry to a plurality of storage positions in the array simultaneously.

8. A frame buffer as claimed in claim 7 in which the circuitry for writing pixel data selectively from the color value registers or from the latching circuitry to a plurality of storage positions in the array simultaneously comprises a plurality of multiplexors connected to each of the color value registers and to the latching circuitry, and a source of control signals for causing the multiplexors to select pixel data from the color value registers or from the latching circuitry.

9. A frame buffer as claimed in claim 8 in which the source of control signals for causing the multiplexors to select pixel data from the color value registers or from the latching circuitry comprises circuitry for transferring control signals on the data bus.

10. A frame buffer as claimed in claim 7 further comprising circuitry for causing multiplexors to select pixel data from the data bus.

11. A frame buffer as claimed in claim 7 further comprising a shift register providing a number of storage positions substantially less than the number of pixels in a row of an output display, and circuitry for writing pixel data to the shift register from the array for presentation on an output display.

12. A frame buffer as claimed in claim 7 in which the array of memory cells is arranged in a plurality of planes, and further comprising circuitry for selecting any of the plurality of planes for accessing.

13. A frame buffer designed to be coupled to a data bus and to an output display in a computer system, the frame buffer comprising an array of memory cells for storing data indicating pixels to be displayed on the output display, address decoding circuitry for controlling access to the array, the address decoding circuitry including column address decoding circuitry for selecting groups of adjacent columns of the array, a plurality of circuits for selectively writing to each of the columns of any of said adjacent columns, a plurality of color value registers, latching circuitry for storing pixel data equivalent to a substantial portion of a row of pixel data to be displayed on the output display, where data to be read from the array and data to be written to the array is stored in the latching circuitry, circuitry for writing pixel data from selected groups of adjacent columns of the array to the latching circuitry, and circuitry coupled to the color value registers, the latching circuitry and the data bus for connecting either selected ones of the color value registers, the latching circuitry, or the data bus to ones of the circuits for selectively writing to each of the columns of any of said groups of adjacent columns.

14. A frame buffer as claimed in claim 13 in which the circuitry for connecting either selected ones of the color value registers, the latching circuitry, or the data bus to ones of the circuits for selectively writing to each of the columns of any of said groups of adjacent columns comprises a plurality of multiplexors.

15. A frame buffer as claimed in claim 14 in which the circuitry for connecting either selected ones of the color value registers, the latching circuits, or the data bus to ones of the circuits for selectively writing to each of the columns of any of said groups of adjacent columns comprises circuitry for transferring control signals on the data bus, and a register for storing control signals transferred on the data bus.

16. A frame buffer as claimed in claim 13 further comprising a shift register providing a number of storage positions substantially less than the number of pixels in a row of an output display, and circuitry for writing pixel data to the shift register from the array for presentation on an output display.

17. A method for selecting data to be transferred to a frame buffer comprising the steps of:

storing data in a color value register to indicate a color value of pixels to be stored in a row of the frame buffer, storing data in a plurality of latches to indicate a value of a plurality of pixels stored in a row of the frame buffer;

storing data in a pixel mask register to indicate pixels to which color values are to be written from a color value register for storage in the frame buffer;

providing data defining pixel values on conductors of a data bus to indicate a color value of at least one pixel to be stored in the frame buffer; and providing a plurality of control signals to select for any operation of storing in the frame buffer from among the data in the color value register, the plurality of latches, and the conductors of the data bus the data to be stored in the frame buffer.

18. A method for selecting data to be transferred to a frame buffer as claimed in claim 17 in which the step of providing control signals comprises furnishing at least three independent control signals to select different modes of operation.

19. A method for selecting data to be transferred to a frame buffer as claimed in claim 18 in which the step of providing a plurality of control signals to select for any operation of storing in the frame buffer from among the data in the color value register, the plurality of latches, and the conductors of the data bus the data to be stored in the frame buffer comprises the additional step of:

utilizing the data stored in the pixel mask register as additional control signals to indicate pixels to which color values are to be written from the color value register for storage in the frame buffer.

20. A method for selecting data to be transferred to a frame buffer as claimed in claim 17 further comprising causing a plurality of multiplexors to select pixel data from among the data in the color value register, the plurality of latches, and the conductors of the data bus the data to be stored in the frame buffer.

* * * * *

UNITED STATES PATENT AND TRADEMARK OFFICE

CERTIFICATE OF CORRECTION

PATENT NO. : 5, 528, 751

DATED : June 18, 1996

INVENTOR(S) : Priem et al.

It is certified that errors appear in the above-identified patent and that said Letters Patent is hereby corrected as shown below:

In column 5 at line 32, please delete " P, AS " and insert -- RAS --.

In column 8 at line 58, please delete " 08/145,755 " and insert -- 08/145,756 --.

In column 10 at line 64, please delete " 08/195,791 " and insert -- 08/145,755 --.

Signed and Sealed this

Nineteenth Day of November, 1996

Attest:

BRUCE LEHMAN

*Attesting Officer* *Commissioner of Patents and Trademarks*